United States Patent [19]
Brotz

[11] Patent Number: 5,201,886
[45] Date of Patent: Apr. 13, 1993

[54] METHOD OF OPERATING A PULSE THRUSTER

[76] Inventor: Gregory R. Brotz, P.O. Box 1322, Sheboygan, Wis. 53081

[21] Appl. No.: 948,019

[22] Filed: Sep. 21, 1992

Related U.S. Application Data

[62] Division of Ser. No. 481,333, Feb. 20, 1990, Pat. No. 5,148,672.

[51] Int. Cl.$^5$ .......................... F02K 7/02; F02K 11/00
[52] U.S. Cl. ........................................................ 60/204
[58] Field of Search .................. 60/200.1, 203.1, 204, 60/247, 248, 39.06, 39.76, 734; 239/690, 690.1, 692, 695–697, 708; 123/536, 537

[56] References Cited

U.S. PATENT DOCUMENTS

| 502,168 | 7/1893 | Battey | 60/200.1 |
| 3,841,824 | 10/1974 | Bethel | 123/536 |
| 4,091,779 | 5/1978 | Saufferer et al. | 123/536 |
| 4,380,978 | 4/1983 | Maynard et al. | 123/536 |

FOREIGN PATENT DOCUMENTS 2092668  8/1982  United Kingdom ................ 123/537

Primary Examiner—Louis J. Casaregola
Attorney, Agent, or Firm—William Nitkin

[57] ABSTRACT

A method of operating a pulse thruster comprising delivering electrically charged fuel attracted to a plate having an opposite charge where such fuel is ignited, causing an impulse force, and repeating the process.

2 Claims, 2 Drawing Sheets

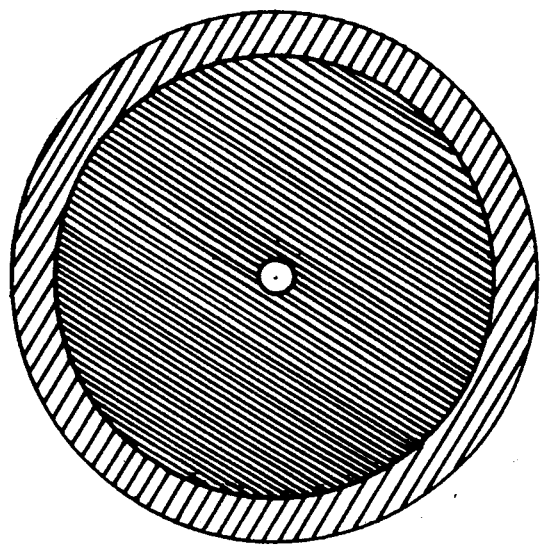
FIG. 4
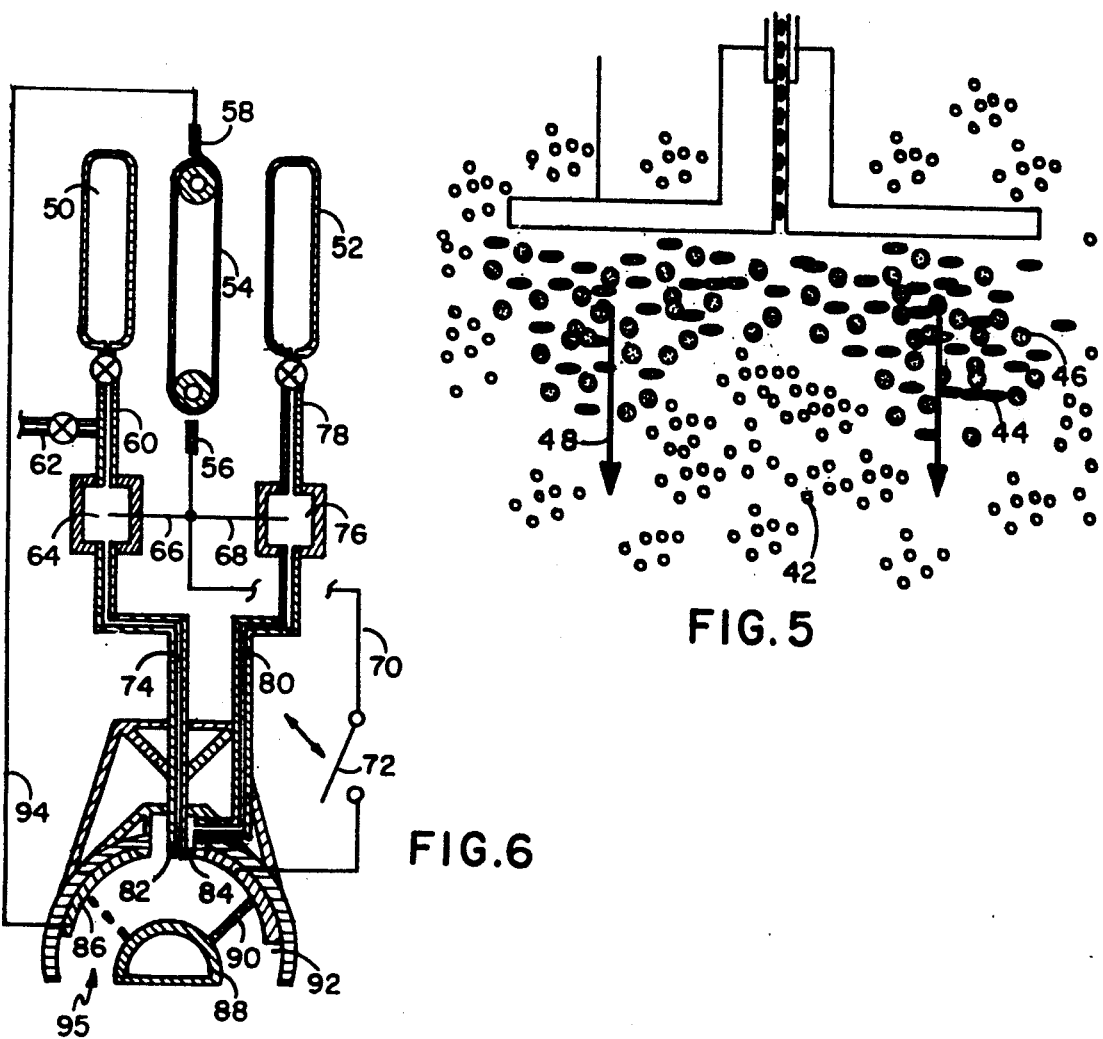
FIG. 5
FIG. 6

METHOD OF OPERATING A PULSE THRUSTER

This application is a division of application Ser. No. 07/481,333, filed Feb. 20, 1990 U.S. Pat. No. 5,148,672.

BACKGROUND OF THE INVENTION

1. Field of the Invention

The device of this invention resides in the area of propulsion devices and more particularly relates to an impulse reaction propulsion device.

2. Description of the Prior Art

Rocket engines are well known in the prior art wherein mixed fuel and an oxidizer ignite, and the explosive reaction exits a nozzle at the rear of the rocket at a force which provides an opposite force to propel the rocket.

SUMMARY OF THE INVENTION

The device of this invention is a pulse thruster wherein molecules of vaporized liquid fuel, such as gasoline, are charged by high-voltage static electricity and directed through a pipe to the surface of a plate having a charge opposite the charge of the fuel molecules and against which the charged fuel molecules collect due to the attraction of their opposite charges. A spark is generated at the plate's surface which ignites the fuel and oxidizer present in the ambient atmosphere, causing an explosion with some of the reactants of the explosion hitting the plate and causing a reactive impulse force which moves the plate in a direction opposite such reactive impulse force.

BRIEF DESCRIPTION OF THE DRAWINGS

FIG. 4 illustrates a bottom plan view of the pulse thruster plate.

FIG. 5 illustrates a cross-sectional side view of the pulse thruster plate with force vectors shown.

FIG. 6 illustrates a cross-sectional side view of a pulse thruster having a concave plate with a combustion restrictor element disposed therein.

DESCRIPTION OF THE PREFERRED EMBODIMENT(S)

Figure 1:
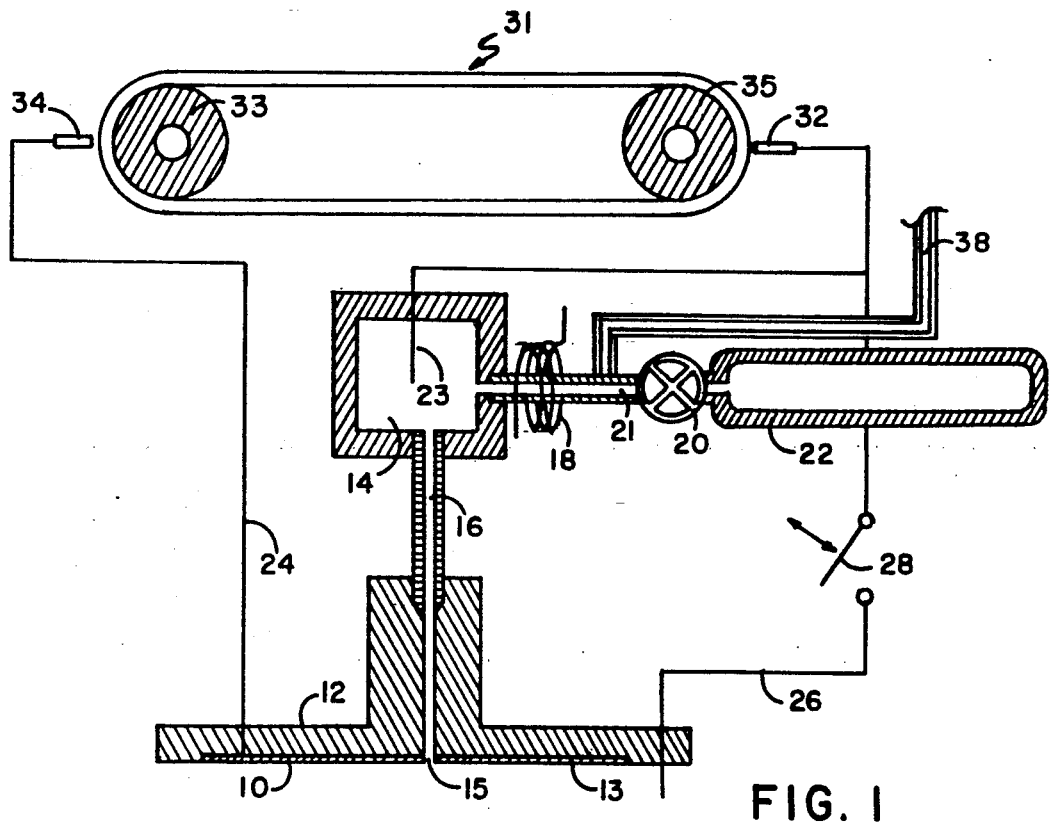
FIG. 1 illustrates a cross-sectional side view of an engine of the type having the pulse thruster of this invention.
Figure 3:
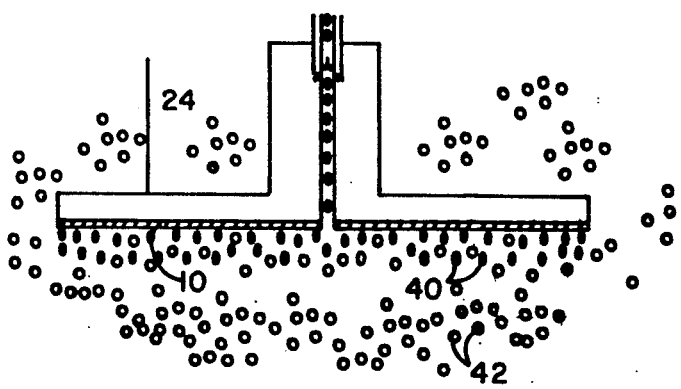
FIG. 3 illustrates a cross-sectional side view of the charged pulse thruster plate with ambient air molecules.
Figure 2:
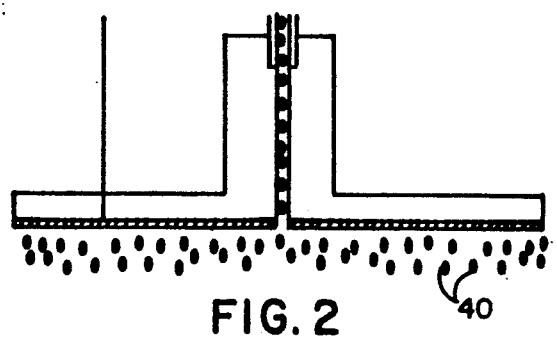
FIG. 2 illustrates a cross-sectional view of charged fuel molecules attracted to the oppositely charged surface of the pulse thruster plate.

FIG. 1 illustrates a diagrammatical cross-sectional side view through a pulse thruster of this invention. Seen in this view is pulse thruster plate 10 which can be generally flat and round as seen in the bottom plan view thereof in FIG. 4. The plate of FIG. 1 has at its center aperture 15 which receives electrically charged fuel molecules through pipe 16 extending from fuel-charging chamber 14. The fuel contained in tank 22 is allowed to pass through valve 20 and through tube 21 by a heating coil 18 which heats the fuel as it passes into fuel-charging chamber 14. Fuel-charging chamber 14 has a charging wire probe 23 which extends to static generator 31 as seen in end and top views in FIG. 1. Static generator 31 consists of a belt 30 which is rotated on wheels 33 and 35 by collector brushes 32 and 34 thereby generating a high-voltage static charge on the brushes which is transferred along wires 26 and 24. Wire 26 has a portion thereof which extends to charging wire probe 23 within fuel-charging chamber 14. Wire 26 also extends further through switch 28 to the surface of plate 10. Wire 24, carrying an electrical charge opposite that on wire 26, extends from static generator 31 to charging plate 10. Along tube 21 is gas engine fuel line 38 which diverts a portion of the fuel along line 38 to gas engine 36 which drives static generator 31 so as to create positive and negative charges respectively at collector brushes 32 and 34. The fuel, when in fuel-charging chamber 14, picks up the charge of collector brush 32 through charging wire probe 23, and such charged fuel exits through pipe 16 and passes out aperture 15 in the center of plate 10 and the charged fuel collects, as seen in FIG. 2, along the surface of plate 10. Since the fuel molecules are of the opposite charge from that of the surface of plate 10, such fuel, being charged by the opposite static charging electrode than the one interconnected to plate 10, as seen in FIG. 2, is attracted to surface 13 of plate 10. As seen in FIG. 3, ambient air molecules 42 which contain oxygen are around the structure and can mix with fuel 40. When the device is ready for operation, switch 28 is closed and the charge from static generator 31 through brush 32 also passes down to plate 10. A spark jumps from plate 10 to the portion of wire 26 extending beyond plate 10 which spark ignites the fuel then attracted and mixed with air along the surface of pulse thruster plate 10. This ignition creates a force vector 48 as seen in FIG. 5 as all of the particles ignite, creating a force against plate 10 and an opposite reactive force in the direction as shown by the force vector arrows. What is left after ignition is the remaining exhaust of carbon dioxide particles 46 and water particles 44. Switch 28 is then opened. At this time further charged fuel passes down pipe 16 through aperture 15 and again comes out onto the surface of plate 10 where it is attacted because of its opposite charge, and the process as described above re-occurs to create a pulse thruster which will then ignite the fuel when switch 28 is again closed. This sequence continues creating a positive force moving the pulse thruster engine of this invention.

FIG. 6 illustrates an alternate embodiment of the device of this invention wherein the plate 86 is concave and has placed therein a dome-like member 88 which acts as a wind protector and combustion restrictor. Charged particles of fuel and oxidizer adhere to the oppositely charged concave thruster plate 86 and are ignited by the spark from a high-voltage static generator 54, such as a Van de Graaff generator, by the closure of switch 72. Electrical line 94 extends from brush 58 on one pole of high-voltage static gnerator 54 to concave plate 86 while line 70 extends from the oppositely charged brush 56 of high-voltage static generator 54. Line 70 is adapted to extend to near the surface of concave plate 86. In this embodiment not only is the fuel contained within the structure in fuel tank 50 but also the oxidizer is carried within tank 52 so that the pulse thruster can operate without the need for an oxidizer in any ambient atmosphere. The fuel and oxidizer can be any well known fuel such as rocket fuel and its associated oxidizer. The fuel and oxidizer pass by flow control valves through lines 60 and 78 respectively into fuel-charging chamber 64 and oxidizer-charging chamber 76 which are interconnected to the charge emanating from brush 56 along line 70 by electrical line 66 extending off line 70 into fuel-charging chamber 64 and electrical line 68 extending off line 70 into oxidizer charging chamber 76. In this manner both the fuel and oxidizer are similarly charged within such chambers from high-voltage static generator 54, and the fuel passes through fuel line 74 and the oxidizer passes through oxidizer line 80 to the base of concave plate 86 where the oxidizer can pass out through oxidizer opening 84 and the fuel can pass out through fuel opening 82 where they both are attracted to, and mixed at, oppositely charged concave plate 86. Concave plate 86 receives its charge along electrical line 94 from the opposite pole brush 58 of high-voltage static generator 54. In this way both charged fuel and charged oxidizer are present along the surface of curved plate 86 which can be parabolic or of other curved shape ready for ignition when switch 72 is closed directing the opposite charge from curved plate 86 from brush 56 through line 70 to pole 92 near the surface of curved plate 86 where the mixture of fuel and oxidizer then explodes, creating the same kind of intermittent pulsed propulsion as discussed above. Dome-like member 88 having a similar curvature to that of curved plate 86 can be suspended within the perimeter of curved plate 86 by support members 90 spaced away therefrom so as to provide an area 95 therebetween for the combustion products to explode. Dome-like member 88 acts as both a wind protector to prevent the charged particles from being blown away from curved plate 86 while they are in the process of accumulating before the spark is intermittently pulsed.

There is again a period of time for the electrically charged particles of fuel and oxidizer to re-emerge from openings 82 and 84 and reaccumulate on oppositely charged curved plate 86. Dome-like member 88 also tends to restrict the combustion to within the curved plate which restriction helps to create greater force out the area 95 of combustion. Fuel line 62 also extends off line 60 which runs to the electrostatic generator motor, such as previously discussed, to drive high-voltage static generator 54.

Although the present invention has been described with reference to particular embodiments, it will be apparent to those skilled in the art that variations and modifications can be substituted therefor without departing from the principles and spirit of the invention.

I claim:

1. A method of propulsion comprising the steps of:
providing a plate having an electrical charge;
depositing fuel particles of opposite charge to said plate in the presence of an oxidizer;
attracting said oppositely charged fuel particles to said plate; and
igniting said fuel particles wherein said explosion moves said plate.

2. The method of claim 8 further including the steps of:
repeatedly repeating the steps of claim 1.

* * * * *